US008458749B2

(12) United States Patent
Howcroft et al.

(10) Patent No.: US 8,458,749 B2
(45) Date of Patent: Jun. 4, 2013

(54) SYSTEM AND METHOD FOR AN INTERACTIVE INTERNET RADIO APPLICATION IN AN INTERNET PROTOCOL TELEVISION SYSTEM

(75) Inventors: Jerald R. Howcroft, Beverly Hills, MI (US); Paul Van Vleck, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 515 days.

(21) Appl. No.: 12/629,258

(22) Filed: Dec. 2, 2009

(65) Prior Publication Data

US 2011/0131600 A1 Jun. 2, 2011

(51) Int. Cl.
*G06F 3/00* (2006.01)
*G06F 13/00* (2006.01)
*H04N 5/445* (2011.01)
*H04N 21/472* (2006.01)
*H04N 21/482* (2006.01)
*H04N 21/258* (2006.01)

(52) U.S. Cl.
CPC ...... *H04N 21/47202* (2013.01); *H04N 21/4826* (2013.01); *H04N 21/25891* (2013.01)
USPC .............................................. 725/61; 725/37

(58) Field of Classification Search
None
See application file for complete search history.

(56) References Cited

U.S. PATENT DOCUMENTS

| 6,434,621 | B1 | 8/2002 | Pezzillo et al. | |
|---|---|---|---|---|
| 2002/0124071 | A1* | 9/2002 | Proehl et al. | 709/223 |
| 2004/0244042 | A1 | 12/2004 | Billmaier | |
| 2006/0259927 | A1 | 11/2006 | Acharya et al. | |
| 2007/0259927 | A1 | 11/2007 | Suzuki et al. | |
| 2009/0164654 | A1 | 6/2009 | Krstulich | |
| 2009/0172736 | A1* | 7/2009 | Tsui et al. | 725/40 |
| 2010/0281179 | A1* | 11/2010 | Istavan et al. | 709/231 |

OTHER PUBLICATIONS

Archived "shoutcast.com" webpage. Jan. 2, 2008. Retrieved from web.archive.org Apr. 19, 2012. http://web.archive.org/web/20080102224031/http://www.shoutcast.com/.*

* cited by examiner

*Primary Examiner* — Bennett Ingvoldstad
(74) *Attorney, Agent, or Firm* — Guntin & Gust, PLC; Jay Anderson

(57) ABSTRACT

A set-top box for an Internet protocol television (IPTV) network includes a radio interface module, a remote control interface module, and a display interface module. The radio interface module accesses an Internet radio service on the IPTV network and outputs a list of Internet radio stations received from the Internet radio service to a particular IPTV channel on the display interface module, receives a selection of an Internet radio station from the remote control interface module, retrieves an Internet radio stream associated with the selected Internet radio station from the Internet radio service in response to receiving the first selection, and outputs the Internet radio steam on the particular IPTV channel of the display interface module.

20 Claims, 6 Drawing Sheets

SYSTEM AND METHOD FOR AN INTERACTIVE INTERNET RADIO APPLICATION IN AN INTERNET PROTOCOL TELEVISION SYSTEM

FIELD OF THE DISCLOSURE

The present disclosure generally relates to an Internet protocol television system, and more particularly relates to an interactive Internet radio application in an Internet protocol television system.

BACKGROUND

An Internet protocol television (IPTV) service provider can transmit an IPTV signal to a user of the IPTV system via a central office, a serving area interface, and a residential gateway. The IPTV service provider can offer the user a variety of different content and services. For example, the IPTV service provider can supply users with real-time television programs that are typically available for the users to watch only at a specific date and time. The IPTV service providers can also offer the users on-demand movies that are available for an extended amount of time and that are provided to the users upon request of the on-demand movie. The user can record audio or video content for storage in a digital format on the user's set-top box or on a data server on the IPTV system. The user can also interact through the user's set-top box to gain access to interactive content on the IPTV system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
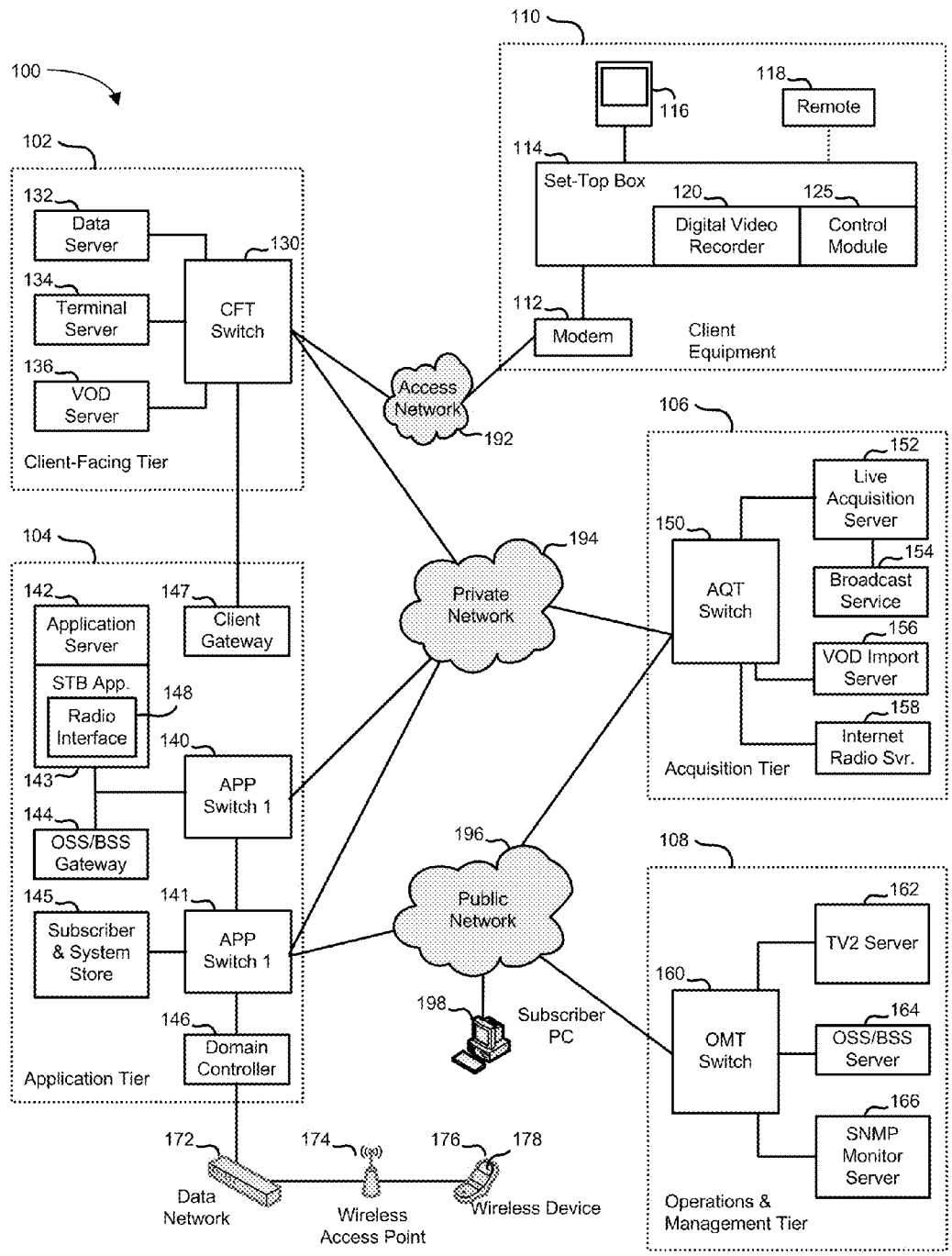
FIG. 1 is a block diagram illustrating an embodiment of an IPTV network including a radio interface module.

FIG. 1 shows an embodiment of an IPTV system 100 including a client facing (CF) tier 102, an application tier 104, an acquisition tier 106, an operations and management (OM) tier 108, and one or more sets of client equipment 110. Client equipment 110 is typically located at the home or business premises of a subscriber to the IPTV system 100. IPTV system 100 includes an access network 192, a private network 194, and a public network 196. Each tier 102, 104, 106, and 108 is coupled to one or more of access network 192, private network 194, and public network 196. In an embodiment, CF tier 102 is coupled to access network 192 and to private network 194, application tier 104 is coupled to private network 194 and to public network 196, acquisition tier 106 is coupled to private network 194 and to public network 196, and OM tier 108 is coupled to public network 196. Client equipment 110 is coupled to access network 192.

Networks 192, 194 and 196 communicate information between tiers 102, 104, 106, and 108, and client equipment 110. Access network 192 communicates information between CF tier 102 and client equipment 110. Private network 194 communicates information between CF tier 102 and application tier 104, between application tier 104 and acquisition tier 106, and between acquisition tier 106 and CF tier 102. Public network 196 communicates information between application tier 104 and acquisition tier 106, between acquisition tier 106 and OM tier 108, and between OM tier 108 and application tier 104. Information is also communicated directly between CF tier 102 and application tier 104, as described below. The information communicated between tiers 102, 104, 106, and 108, and client equipment 110 includes encoded television programs, audio files, data files, commands, procedures, other information, or any combination thereof.

CF tier 102 communicates with multiple sets of client equipment 110 over a wide geographic area, such as a regional area, a metropolitan area, a viewing area, or any other suitable geographic area that is supported by access network 192. Client equipment 110 includes a modem 112, a set-top box 114, a display device 116, and a remote control 118. The set-top box 114 includes a digital video recorder (DVR) 120 and a control module 125. Modem 112 is coupled to access network 192, and translates information from a form suitable for transmission over access network 192 to a form suitable for use by set-top box 114, and vice versa. In a non-limiting example, modem 112 is coupled to access network 192 via fiber-optic cables, a digital subscriber line (DSL), another network fabric, or any combination thereof. In a particular embodiment, set-top box 114 includes a display interface module (not illustrated).

The information that CF tier 102 communicates to modem 112 is sent to set-top box 114, which processes the information into a form suitable for display by display device 116 or for recording by DVR 120. Set-top box 114 receives digitally encoded content from CF tier 102 for display on display device 116, or for recording by DVR 120. Set-top box 114 can also receive data from CF tier 102, and render or display the data on display device 116. Further, set-top box 114 can send data to CF tier 102. Such data can include service requests, or commands from the subscriber, received by set-top box 112 via remote control 118. For example, control module 125 can include a remote control interface module (not illustrated) for receiving inputs to set-top box 112 from remote control 118. In this way, the subscriber can request services or information or respond to a request for information from IPTV system 100. Control module 125 includes instructions that are executable by set-top box 114 to control the data flow between the subscriber and IPTV system 100. Control module 125 can include an IPTV software platform such as Microsoft® TV IPTV Edition.

Control module 125 can facilitate data communication between set-top box 114 and IPTV system 100. For example, control module 125 can include a procedure whereby set-top box 114 receives a request to record content on DVR 120, or sends a status to IPTV system 100 that the content has been recorded. Likewise, control module 125 can include a procedure whereby the subscriber can interact with IPTV system 100 to receive and execute a viewing preference that the subscriber has created in IPTV system 100. Such preferences can be created via remote control 118, or through a subscriber account that is accessible through public network 196, such as through a subscriber's personal computer 198. A non-limiting example of remote control 118 includes a hand-held controller device, a game controller device, a keyboard/mouse device, another control device, or any combination thereof.

CF tier 102 includes a client-facing tier (CFT) switch 130, a data server 132, a terminal server 134, and a video-on-demand (VOD) server 136. CFT switch 130 manages communication with client equipment 110 through access network 192 and with application tier 104 and acquisition tier 106 through private network 194. CFT switch 130 is coupled to data server 132 that stores data transmitted in response to subscriber requests. CFT switch 130 is also coupled to terminal server 134 that provides terminal devices, such as a game application server, or other devices with a common connection point to private network 194. CFT switch 130 is also coupled to VOD server 136.

Application tier 104 includes application tier (APP) switches 140 and 141, an application server 142, an operation systems and support/billing systems and support (OSS/BSS) server 144, a subscriber and system store 145, a domain controller 146, and a client gateway 147. APP switches 140 and 141 manage communication with CF tier 102 and acquisition tier 106 through private network 194. APP switch 141 also manages communication with acquisition tier 106 and OM tier 108 through public network 196. APP switch 140 is coupled to APP switch 141. APP switch 140 is also coupled to application server 142 and to OSS/BSS gateway 144. Application server 142 provides applications to set-top box 114 through a set-top box application 143, so that set-top box 114 can provide functions such as recording and displaying content, messaging, and processing of IPTV data and VOD material. OSS/BSS gateway 144 includes operation systems and support (OSS) data, and billing systems and support (BSS) data.

APP switch 141 is coupled to domain controller 146 and to subscriber and system store 145. Domain controller 146 provides web access, for example, to subscribers via public network 196. Subscriber and system store 145 includes account information that is associated with subscribers who access IPTV system 100 via private network 194 or public network 196. Application tier 104 also communicates data directly to CF tier 102 through client gateway 147. In this embodiment, client gateway 147 is coupled directly to CFT switch 130.

Client gateway 147 provides subscriber access to private network 194 and tiers coupled thereto. In particular, set-top box 114 accesses IPTV system 100 via access network 192 using information received from client gateway 147. Access network 192 provides security for private network 194. Client equipment 110 accesses client gateway 147 via access network 192, and client gateway 147 allows client equipment 110 to access private network 194 once client equipment 110 is authenticated or verified. Similarly, client gateway 147 prevents unauthorized client equipment (not illustrated), such as hacker computers or stolen set-top box devices, from accessing private network 194 by denying access to these devices beyond access network 192.

For example, when set-top box device 114 accesses IPTV system 100 via access network 192, client gateway 147 verifies subscriber information by communicating with subscriber and system store 145 via private network 194, APP switch 140, and APP switch 141. Further, client gateway 147 verifies billing information and status by communicating with OSS/BSS gateway 144 via private network 194 and APP switch 140. OSS/BSS gateway 144 transmits a query across APP switch 140, to APP switch 141, and APP switch 141 communicates the query across public network 196 to an OSS/BSS server 164 (described below). After the client gateway 147 confirms subscriber and/or billing information, client gateway 147 allows set-top box device 114 access to IPTV system 100 content and VOD server 136 content. If client gateway 147 cannot verify subscriber information for set-top box 114, such as when set-top box 114 is connected to a different twisted pair, or when set-top box 114 is stolen, client gateway 147 denies transmissions to and from set-top box device 114 beyond access network 192.

Domain controller 146 communicates with public network 196 via APP switch 141. Domain controller 146 includes a web portal that allows a subscriber to access IPTV system 100 using a personal computer 198. Domain controller 146 also communicates with a data network 172 that is connected to a wireless access point 174. Wireless access point 174 communicates with a subscriber's wireless device 176 to provide wireless access to IPTV system 100. A non-limiting example of a wireless device 176 includes a cellular telephone, a personal digital assistant, a mobile e-mail device, a portable digital video device, another wireless device, or any combination thereof. Wireless device 176 includes a display device 178 for displaying information from IPTV system 100. Display device 178 includes a text display, a picture display, a video display or any combination thereof.

Acquisition tier 106 includes an acquisition tier (AQT) switch 150, a live acquisition server 152, a broadcast service 154, a video-on-demand importer server 156, and an Internet radio importer server 158. AQT switch 150 manages communication with CF tier 104 and application tier 104 through private network 194, and with application tier 104 and OM tier 108 through public network 196. AQT switch 150 is coupled to live acquisition server 152, video-on-demand importer server 156, and Internet radio importer server 158. Live acquisition server 152 acquires television content from broadcast service 154. Live acquisition server 152 sends the television content to AQT switch 150 for transmission to CF tier 102 via private network 194. The television content is further encoded at data server 132, and sent to client equipment 110 via access network 192. Set-top box 114 receives the television content from modem 112, decodes the television content, and transmits the information to display device 116 according to commands from remote control device 120.

Additionally, VOD importer server 156 receives content from one or more video-on-demand sources that are outside IPTV system 100, such as movie studios and programmers of non-live content. VOD importer server 156 transmits the video-on-demand content to AQT switch 150, and AQT switch 150 communicates the material to CFT switch 130 via private network 194. The video-on-demand content is stored on VOD server 136. When a subscriber issues a request for VOD content to set-top box 114 through remote control 118, the request is transmitted over access network 192 to VOD server 136 via CFT switch 130. Upon receiving such a request, VOD server 136 retrieves the requested VOD content and transmits the content to set-top box or 114 across access network 192 via CFT switch 130. Also, Internet radio importer server 158 receives content from one or more Internet radio sources that are outside IPTV system 100. Internet radio importer server 158 transmits the Internet radio content to AQT switch 150, and AQT switch 150 communicates the material to CFT switch 130 via private network 194. The Internet radio content is accessed by a radio interface module 148, as described below.

OM tier 108 includes an OM tier (OMT) switch 160, a TV2 server 162, the OSS/BSS server 164, and a simple network management protocol (SNMP) monitor server 166. OMT switch 160 manages the communication between OM tier 108 and public network 196. OMT switch 160 is coupled to TV2 server 162, OSS/BSS server 164, and SNMP monitor server 166 that monitors network devices. TV2 server 162 receives television content from live acquisition server 152, or video-on-demand content from VOD importer server 156 through public network 196. The television and video-on-demand content is sent by TV2 server 162 to OMT switch 160 and forwarded to a subscriber of IPTV system 100 who accesses public network 196 through personal computer 198.

Set-top box application 143 includes a radio interface module 148. Radio interface module 148 provides a personalized interface to Internet based radio/music services for subscribers to IPTV system 100. When a subscriber wishes to interact over IPTV system 100 with Internet based radio/music services, the subscriber interacts with radio interface module 148, for example by tuning set-top box 114 to a music and radio channel. The subscriber is presented with menu selections to search for and play radio and music stations, view information related to the content played on selected radio and music stations, view content playlist histories and video content related to the content, manage parental control settings for sub-accounts related to the subscriber's main account, create lists of favorite radio and music stations, and synchronize favorites lists to mobile devices or personal computers. In the illustrated embodiment, radio interface module 148 resides in the application tier 104 on the application server 142. In another embodiment (not illustrated), set-top box 114 includes a radio interface module similar to radio interface module 148 to provide the described functionality of radio interface module 148. In another embodiment (not illustrated), the functionality of radio interface module 148 is implemented as a combination of modules in set-top box 114, in application server 142, and in other portions of IPTV system 100. The Internet based radio/music services include publicly available radio and music services on the Internet, radio and music services provided by the operator of IPTV system 100, other proprietary radio and music services, or a combination thereof.

FIGS. 2-7 illustrate screens depicted on display device 116 generated by an embodiment of radio interface module 148. In each case, content information can be sent by application server 142 to CF tier 102, where data server 132 can format the information into a form suitable for transmission to set-top box 114 for display on display device 116. In the alternative, application server 142 can format the information in a form suitable for transmission to set-top box 114, and send the information to CFT switch 130 to be forwarded to set-top box 114. The subscriber can interact via remote control 118 with set-top box 114 to provide information back to application server 142, and thus perform the actions described below. In each case, the elements depicted on the screens are illustrative of features of radio interface module 148, and are not meant to limit the content that may be displayed on display device 116. For example, the information contained in the screens may be shown alone, or in combination with other information such as advertisements, other news or weather information, a picture-in-picture display, other content, or a combination thereof. Each of the screens depicted in FIGS. 2-7 can be accessed through one or more screens (not illustrated) that direct the subscriber to the appropriate screens which enable the subscriber to perform the described functionality.

Figure 2:
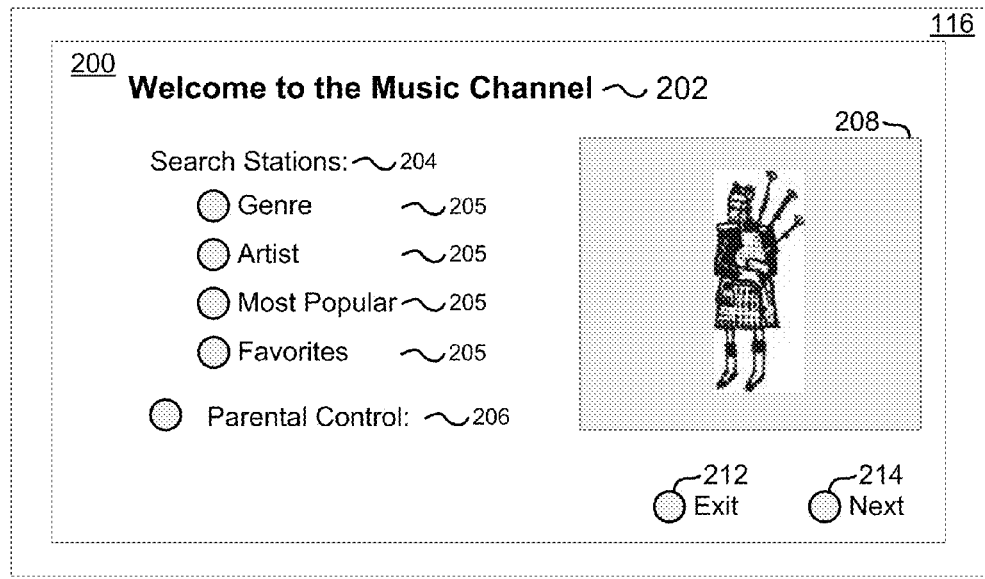
FIGS. 2 through 7 are illustrations of screens generated by the radio interface module as depicted on a display device in the IPTV network.

FIG. 2 illustrates an embodiment of a music channel welcome screen 200 depicted on display device 116, including a welcome banner 202, a station search selection banner 204, one or more predetermined search criteria selections 205, a parental control selection 206, an image window 208, an exit selection 212, and a next selection 214. Welcome banner 202 identifies the current screen as the screen with which the subscriber interacts to search for radio and music stations. Station search selection banner 204 prompts the subscriber to select from the list of search criteria selections 205, taking the subscriber to a genre and artist screen 220 described below with respect to FIG. 3, or to a favorites screen 280 described below with respect to FIG. 6. Parental control selection 206 prompts the subscriber to select the parental control option, taking the subscriber to a parental control screen 300 described below with respect to FIG. 7. Image window 208 provides an area where the operator of IPTV system 100 can place content, such as a music channel related welcome image or advertising content. Exit selection 212 permits the subscriber to end the interaction with radio interface module 148. In the embodiment where interaction with radio interface module 148 is initiated by selecting an Internet radio channel on set-top box 114, exit selection 212 is optional, and the functionality of exit selection 212 can be performed by changing channels on set-top box 114. Next selection 214 permits the subscriber to continue the interaction with radio interface module 148 through the following screens, as described below.

In operation, the subscriber selects a search criteria selections 205 or parental control selection 206 with which the subscriber wishes to interact by using up-down, left-right, and select buttons on remote control 118. For example, to select the predetermined search criteria selections 205 labeled "Artist," the subscriber can push a down button on remote control 118 twice, scrolling down through search criteria selections 205 until "Artist" is highlighted, and then push a select button on remote control 118 to select the "Artist" search criteria selection 205. In a particular embodiment, search criteria selections 205 are included on music channel welcome screen 200 based upon music and radio services provided by the operator of IPTV system 100 as a service to subscribers. An example of a search criteria includes searching for music and radio services that play a particular genre of music or type of programming or that play the works of a particular artist. Another example of a search criteria includes searching for music and radio services based upon their popularity. In a particular embodiment, radio interface module 148 accesses Internet based music and radio services to retrieve music and radio services based upon their popularity within the services to provide a list of favorites from among a large number of listeners. In another embodiment, radio interface module 148 tracks popularity of music and radio services within IPTV system 100 to provide a list of favorites from among subscribers to IPTV system 100. In yet another embodiment, radio interface module 148 tracks popularity of music and radio services within each set of client equipment 100 to provide a list of favorites within a household.

Figure 3:
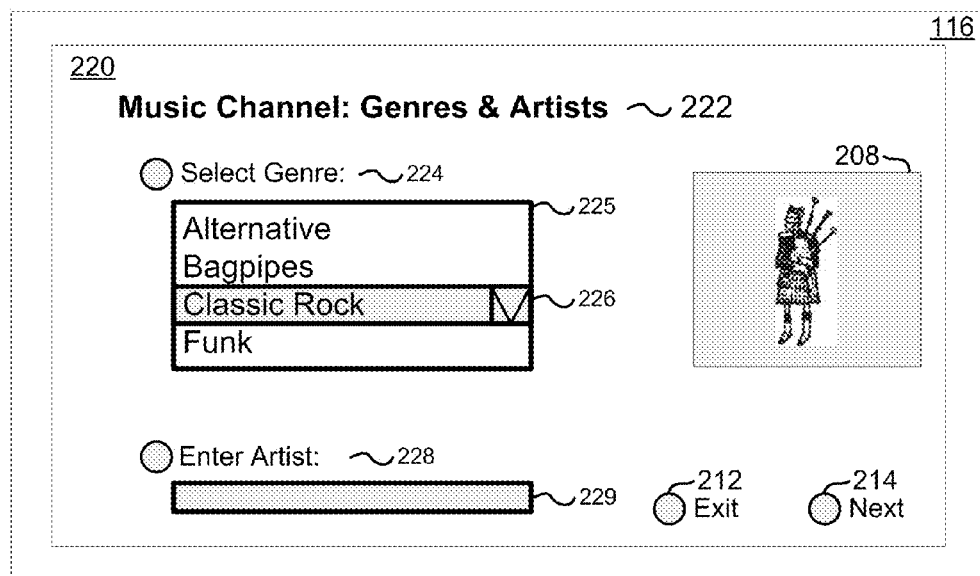

FIG. 3 illustrates an embodiment of a genre and artist screen 220 depicted on display device 116, including an image window 208, an exit selection 212, a next selection 214, a welcome banner 222, a genre selection 224, a genre window 225 with a list of predetermined genres and a selection bar 226, an artist selection 228, and an artist entry box 229. Welcome banner 222 identifies the current screen as the screen with which the subscriber interacts to select genres or artists to search for radio and music stations. In operation, the subscriber selects one of genre selection 224 or artist selection 228 with which the subscriber wishes to interact by using up-down, left-right, and select buttons on remote control 118. For example, to select from radio and music stations in the genre labeled "Classic Rock," the subscriber can push a down button on remote control 118 once to highlight genre selection 224, and then push the select button on remote control 118 to select genre selection 224. The subscriber can then push the down button on remote control 118 three times, scrolling down through the list of genres in genre window 225 until selection bar 226 highlights "Classic Rock," and then push the select button. In another example, to select from radio and music stations that play a particular artist, the subscriber can push a down button on remote control 118 twice to highlight artist selection 228, and then push the select button on remote control 118 to select artist selection 228. The subscriber can then enter the name of the artist in artist entry box 229, and then push the select button. Upon completing the selection of a genre or an artist, the subscriber selects next selection 214 to enter a station selection screen 240 described below with respect to FIG. 4. In a non-limiting example, artist entry box 229 can be filled-in using remote control 118 to provide alpha-numeric entry, using a keyboard (not illustrated), using another information entry mechanism, or a combination thereof. In another embodiment (not illustrated), artist entry box 229 is implemented as a pull-down menu with common artist names.

Figure 4:
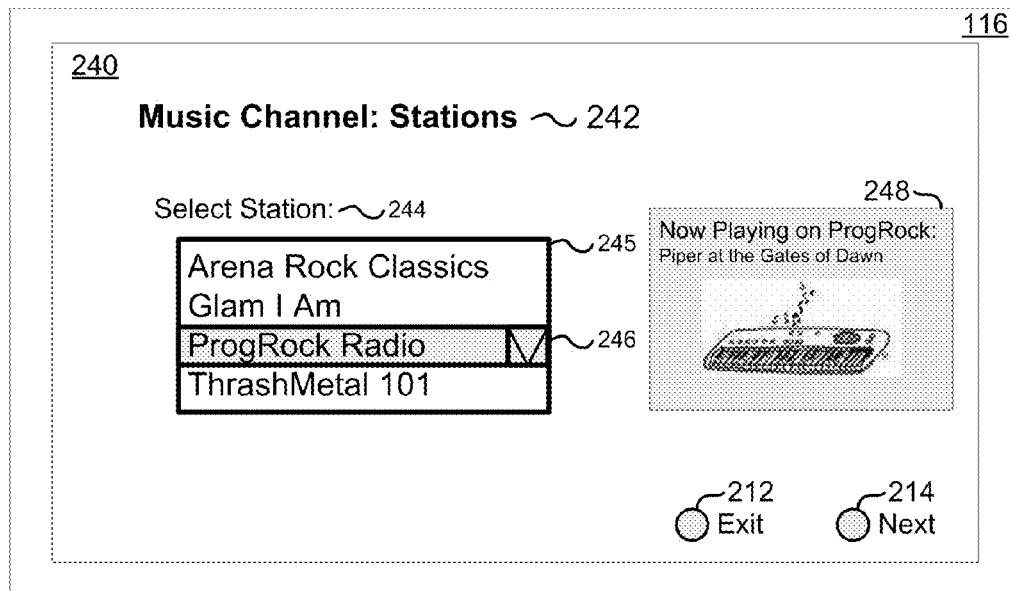

FIG. 4 illustrates an embodiment of a station selection screen 240 depicted on display device 116, including an exit selection 212, a next selection 214, a welcome banner 242, a station banner 244, a station window 245 with a list of predetermined stations and a selection bar 246, and a station window 248. Welcome banner 222 identifies the current screen as the screen with which the subscriber interacts to select radio and music stations to play. Station window 248 provides an area where the operator of a selected radio and music station can place content, such as an image or video clip related to the station or the content item currently being played on the station, or advertising content. In operation, the subscriber selects a station that the subscriber wishes to play from station window 245 by using up-down, left-right, and select buttons on remote control 118. Upon completing the selection of a station, the subscriber selects next selection 214 to enter a station screen 260 described below.

Figure 5:
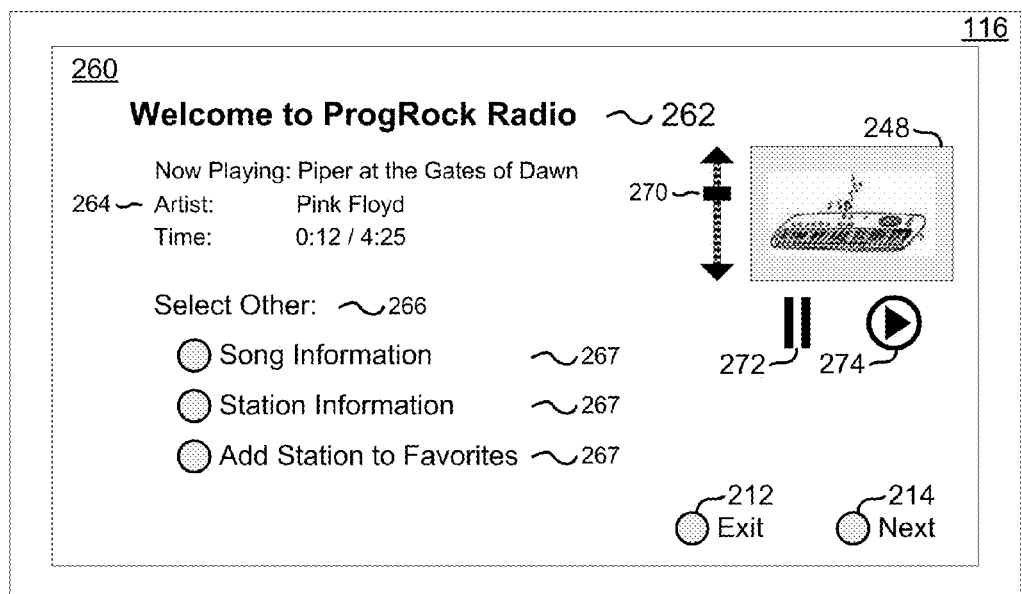

FIG. 5 illustrates an embodiment of a station selection screen 260 depicted on display device 116, including an exit selection 212, a next selection 214, a station window 248, a welcome banner 262, an information field 264, an information selection banner 266, one or more information selections 267, a volume adjustment 270, a pause selection 272, and a play selection 274. Welcome banner 262 identifies the current screen as the screen with which the subscriber interacts to play the selected radio and music station. Information field 264 provides an area where the operator of the selected radio and music station can place information, such as information related to the current song or artist playing on the station. Such information can include song title or length, artist, album title, year produced or released, genre, other information related to the song or artist, or a combination thereof. Information selection banner prompts the subscriber to choose one of information selections 267. Information selections 267 can include selections for viewing more extensive song information such as detailed production credits or lyrics, for viewing information related to the station such as recently played songs or other stations related to the selected station, or for adding the selected station to a subscriber's favorites list. The subscriber can also manipulate the playing of the selected station. For example, the subscriber can manipulate volume adjustment 270 to raise or lower the volume of the selected station, can pause the playback of the selected station with pause selection 272, and can restart the playback with play selection 274.

Figure 6:
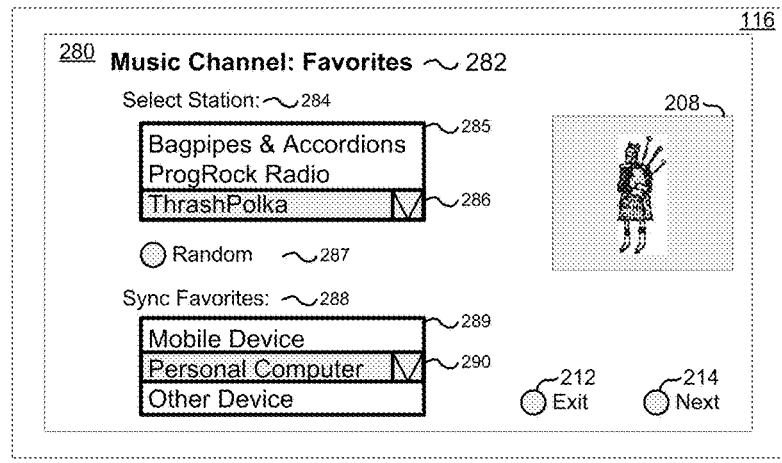

FIG. 6 illustrates an embodiment of a favorites screen 280 depicted on display device 116, including an image window 208, an exit selection 212, a next selection 214, a welcome banner 282, a station banner 284, a station window 285 with a list of favorite selections selected by the subscriber and a selection bar 286, a random selection 287, a synchronization banner 288, a synchronization window 289 with a list of computing devices to which the subscriber can synchronize the list of favorite stations and a selection bar 290. Welcome banner 282 identifies the current screen as the screen with which the subscriber interacts to select a radio and music station to play from among the subscriber's selected favorites, or to synchronize the list of favorite stations with a list of the subscriber's computing devices. In operation, the subscriber selects a station that the subscriber wishes to play from station window 285, or to play from the list of favorites in a random manner by selecting random selection 287.

The subscriber can also choose to synchronize the list of favorites with one or more of the subscriber's computing devices. For example, the subscriber may have a personal computer or a mobile device with which the subscriber wishes to listen to the favorite stations. Radio interface module 148 can then send the list of favorites to the subscriber's computing devices, so that the computing devices remain synchronized with the subscriber's current list of favorites. In a particular embodiment, subscriber's personal computer is connected to IPTV system 100. Here, radio interface module 148 formats information and sends the information over IPTV system 100 to the personal computer and the personal computer incorporates the information into the subscriber's favorites on the personal computer. In another embodiment, the subscriber has a mobile device with an Internet interface. Radio interface module 148 formats information and sends it over the Internet to the mobile device and the mobile device incorporates the information into the mobile device's favorites. In a non-limiting example, the information can be formatted in an e-mail format, a text format, a proprietary format, or a combination thereof.

Figure 7:
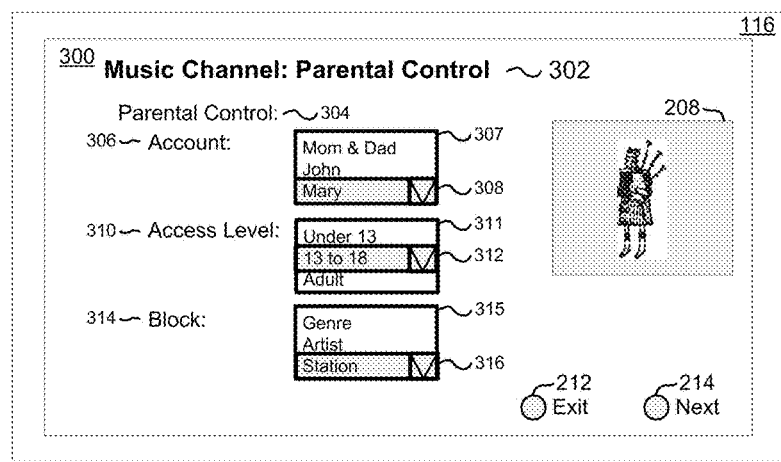

FIG. 7 illustrates an embodiment of a parental control screen 300 depicted on display device 116, including an image window 208, an exit selection 212, a next selection 214, a welcome banner 302, a parental control banner 304, an account selection banner 306, an account window 307 with a list of accounts and sub-accounts on IPTV system 100 that are associated with the subscriber and a selection bar 308, an access level selection banner 310, an access level window 311 with a list of access levels whereby content can be blocked by the subscriber for the selected account and a selection bar 312, a block selection banner 314, and a block criteria window 315 with a list of criteria whereby content can be blocked by the subscriber for a selected account and a selection bar 316. Welcome banner 302 identifies the current screen as the screen with which the subscriber interacts to employ parental control to the accounts and sub-accounts on IPTV system 100 that are associated with the subscriber. In operation, the subscriber selects an account in account window 307 to which the subscriber wishes to apply parental controls. The subscriber then selects an access level in access level window 311 to apply to the selected account. For example, the subscriber can select the account labeled "Mary" and apply the access level labeled "13 to 18," and thus block all content not rated for ages thirteen to eighteen whenever the sub-account labeled "Mary" is accessed. The subscriber can also select other criteria whereby content is blocked by selecting one or more criteria from criteria window 315. Upon selecting a criteria, the subscriber is forwarded to a screen (not illustrated) where the subscriber can select particular stations that conform to the search criteria. For example, the subscriber can select the criteria labeled "Genre" in criteria window 315, be forwarded to a genre selection screen similar to a genre and artist screen 220, and select "Rap," thereby blocking all content tagged as such from the selected account. In a particular embodiment, radio interface module 148 accesses a subscriber profile system (not illustrated) in IPTV system 100 to map parental control settings to the selected accounts.

In performing the functions described above, radio interface module 148 interacts with the Internet based radio/music services to obtain information related to the radio/music services provided on IPTV system 100. In a particular embodiment, radio interface module 148 obtains a uniform resource locator (URL) for the content stream for a station selected by the subscriber, and provides the URL to set-top box 114, and set-top box 114 accesses the provided URL to gain access to the content stream for playback to the subscriber. In another embodiment, radio interface module 148 obtains the URL for the content stream for a station selected by the subscriber, accesses the content stream and forwards the content stream to set-top box 114 for playback. In this embodiment, radio interface module 148 can modify the content stream to insert advertisements or announcements in the content stream, to replace advertisements or announcements in the content stream, or to randomize the content streamed to the subscriber seamlessly, so that transitions to the next station do not occur in the middle of the song playing on the next station. The content stream can include an encoded audio format. A non-limiting example of an audio format includes MPEG Layer-3 (mp3) format, MPEG Layer-4 (mp4) format, Windows Media Audio (WMA) format, another audio format, or a combination thereof.

In a particular embodiment, radio interface module 148 interacts with extensible markup language (XML) application programming interfaces (APIs) of the radio/music services to obtain the URL of the content stream, and other information related to the radio/music services. For example, radio interface module 148 can retrieve a channel guide and menu hierarchy for the stations provided by the radio/music services, a playlist, cover art or another image related to the content stream, metadata related to a song in the content stream, a video stream associated with the song, other information, or a combination thereof. Metadata can include a song title, artist name, album title, song length, lyrics, production credits, or other information related to a song in the content stream.

Figure 8:
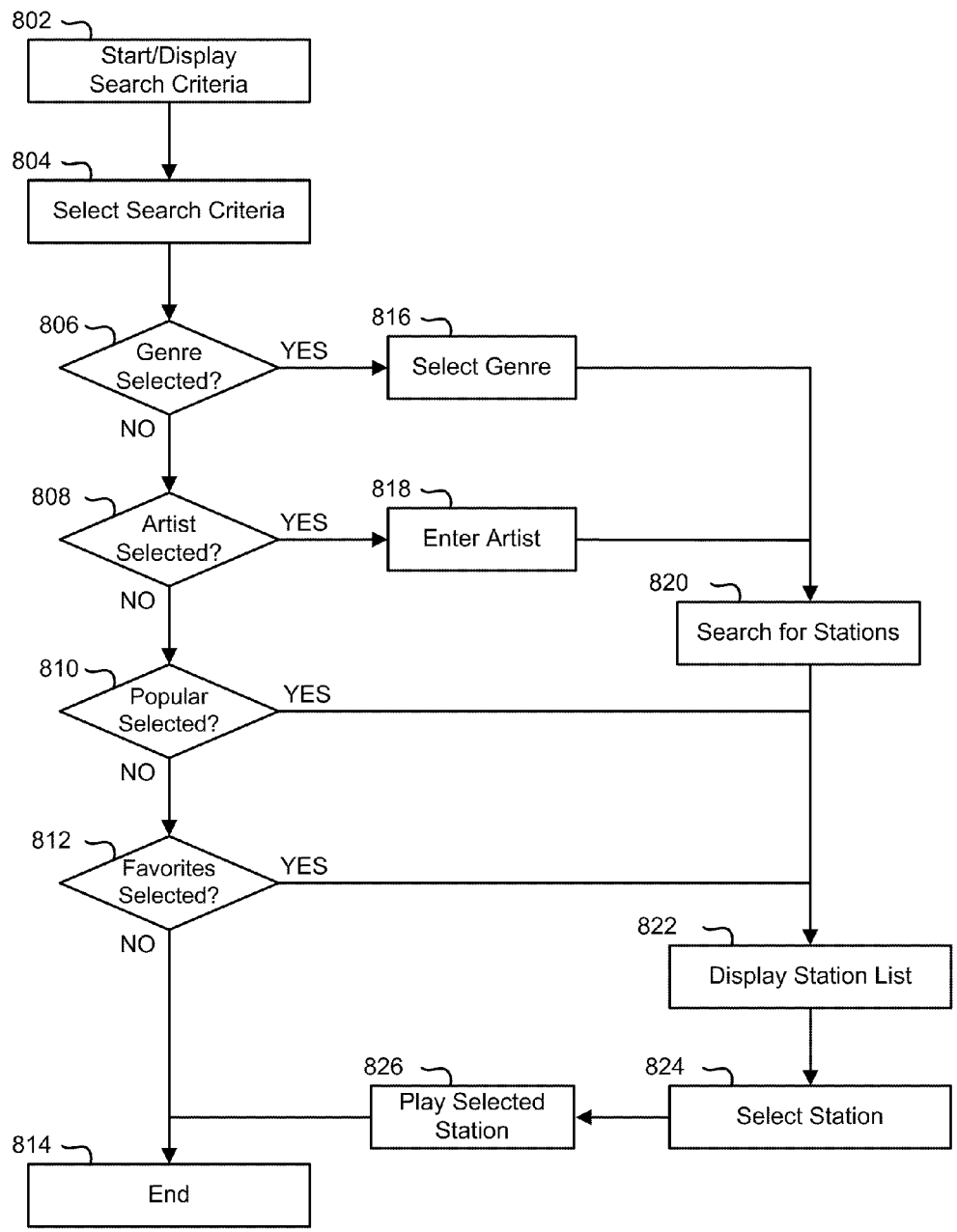
FIG. 8 is a flow chart illustrating an embodiment of a method for implementing an interactive Internet radio application in an IPTV system.

FIG. 8 is a flow chart illustrating an embodiment of a method for implementing an interactive Internet radio application in an IPTV system. The method starts in block 802, where a set of search criteria is displayed. For example, a subscriber can view the list of search criteria on music channel welcome screen 200, including "Genre," "Artist," "Popular," or "Favorites." The subscriber selects search criteria in block 804. Thus, the subscriber can use remote control 118 to interact with radio interface module 148 to select one or more of the search criteria. A decision is made as to whether or not the genre selection was made in decision block 806. If not, the "NO" branch of decision block 806 is taken, and a decision is made as to whether or not the artist selection was made in decision block 808. If not, the "NO" branch of decision block 808 is taken, and a decision is made as to whether or not the popular stations selection was made in decision block 810. If not, the "NO" branch of decision block 810 is taken, and a decision is made as to whether or not the favorites selection was made in decision block 812. If not, the "NO" branch of decision block 812 is taken and processing ends in block 814.

If the genre selection was made, the "YES" branch of decision block 806 is taken and a genre is selected in block 816. For example, the subscriber can be directed to genre and artist screen 220 and use remote control 118 to select a genre from genre window 225. The selected genre is used to search for stations that play music in the selected genre in block 820. Thus radio interface module 148 can access an Internet music site to search for stations that play the selected genre of music. A list of stations that play the selected genre of music is displayed in block 822. Here radio interface module 148 can display station selection screen 240, including a list of Internet radio stations that play the selected genre on set-top box 114 for review by the subscriber. The subscriber selects a station from the list in block 824. Thus the subscriber can use remote control 118 to select a station to play from the list. The station is played in block 826, and processing ends in block 814. As such, radio interface module 148 can stream the selected radio station to set-top box 114.

If the artist selection was made, the "YES" branch of decision block 810 is taken and an artist name is entered in block 818. For example, the subscriber can be directed to genre and artist screen 220 and use remote control 118 to enter an artist in artist entry box 229. The entered artist name is used to search for stations that play music by the entered artist in block 820, and processing continues in block 822, as described above. If the popular stations selection was made, the "YES" branch of decision block 810 is taken, a list of stations that are popular is displayed in block 822, and processing continues in block 824, as described above. If the favorite stations selection was made, the "YES" branch of decision block 812 is taken, a list of the subscriber's favorite stations is displayed in block 822, and processing continues in block 824, as described above.

Figure 9:
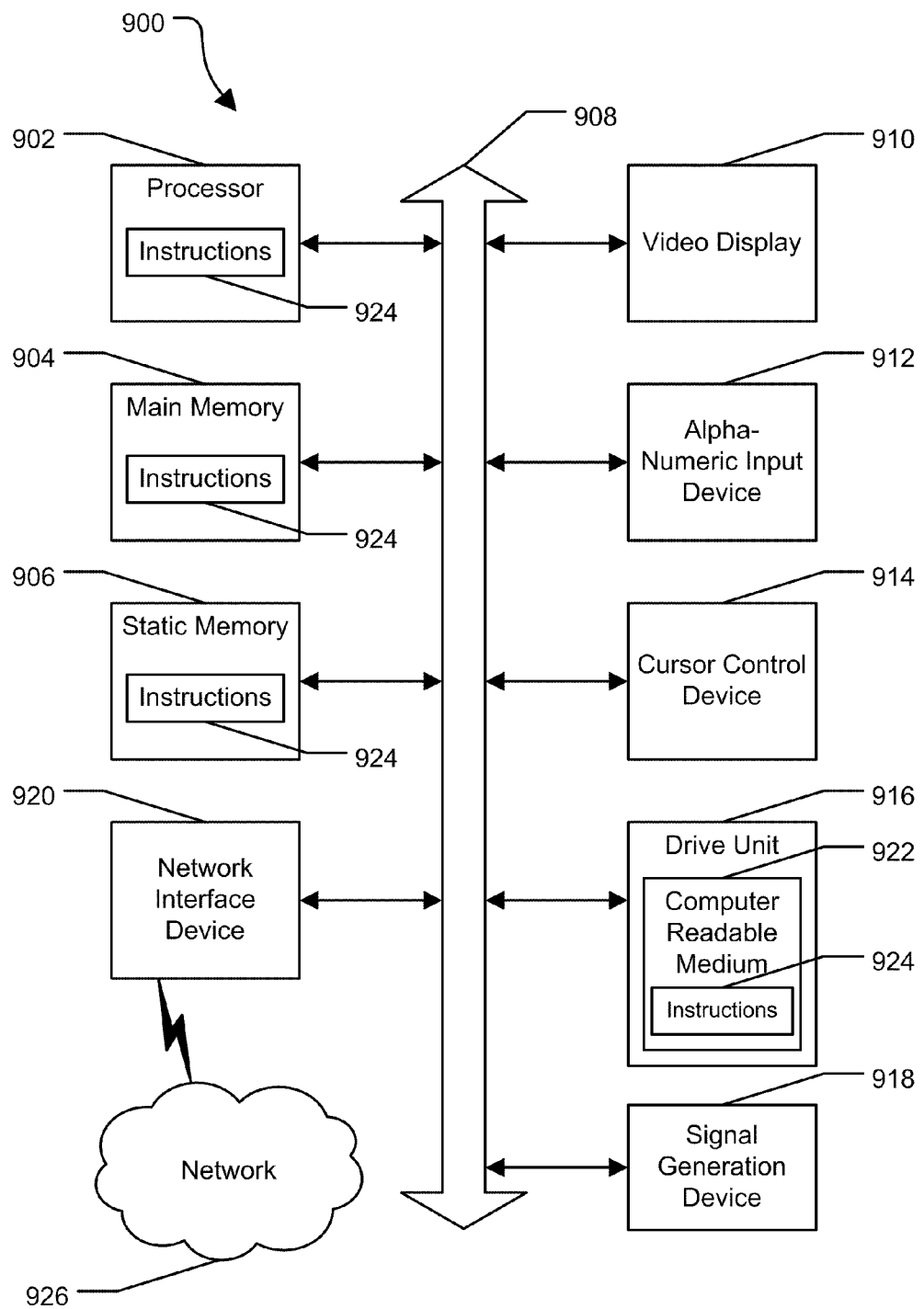
FIG. 9 is a block diagram showing an illustrative embodiment of a general computer system.

FIG. 9 shows an illustrative embodiment of a general computer system 900 in accordance with at least one embodiment of the present disclosure. Computer system 900 includes a set of instructions that can be executed to cause computer system 900 to perform any one or more of the methods or computer based functions disclosed herein. Computer system 900 can operate as a standalone device or can be connected via a network to other computer systems or peripheral devices.

In a networked deployment, computer system 900 operates in the capacity of a server or as a client computer in a server-client network environment, or as a peer computer system in a peer-to-peer (or distributed) network environment. Computer system 900 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 900 is implemented using electronic devices that provide voice, video or data communication. Further, while computer system 900 is illustrated as a single system, the term "system" shall also be taken to include any collection of systems or sub-systems that individually or jointly execute a set, or multiple sets, of instructions to perform one or more computer functions.

Computer system 900 includes a processor 902 such as a central processing unit (CPU), a graphics processing unit (GPU), or both. Moreover, computer system 900 includes a main memory 904 and a static memory 906 that communicate with each other via a bus 908. Computer system 900 further includes a video display unit 910, such as a liquid crystal display (LCD), an organic light emitting diode (OLED), a flat panel display, a solid state display, or a cathode ray tube (CRT). Additionally, computer system 900 includes an input device 912, such as a keyboard, and a cursor control device 914, such as a mouse. Computer system 900 also includes a disk drive unit 916, a signal generation device 918, such as a speaker or remote control, and a network interface device 920.

In a particular embodiment, disk drive unit 916 includes a computer-readable medium 922 in which one or more sets of instructions 924 are embedded. Instructions 924 embody one or more of the methods or logic as described herein. In a particular embodiment, instructions 924 reside completely, or at least partially, within main memory 904, static memory 906, and/or within processor 902 during execution by computer system 900. Main memory 904 and processor 902 also include computer-readable media. Network interface device 920 provides connectivity to a network 926 such as a wide area network (WAN), a local area network (LAN), or other network. The present disclosure contemplates a computer-readable medium that includes instructions 924 or receives and executes instructions 924 responsive to a propagated signal, so that a device connected to network 926 can communicate voice, video or data over network 926. Further, instructions 924 can be transmitted or received by network 926 via network interface device 920.

In an alternative embodiment, dedicated hardware implementations such as application specific integrated circuits, programmable logic arrays and other hardware devices can be constructed to implement one or more of the methods described herein. Applications that include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, or hardware implementations, or a combination thereof.

In accordance with various embodiments of the present disclosure, the methods described herein can be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited.

What is claimed is:
1. A set-top box, comprising:
a memory to store computer instructions; and
a processor coupled to the memory, wherein responsive to executing the computer instructions, the processor performs operations comprising:

accessing an internet radio service on an internet protocol television network and outputting to a display device a list of a plurality of internet radio stations, the list being received from the internet radio service, the list being based on popularity of the plurality of internet radio stations within the internet protocol television network among subscribers to the internet protocol television network;

receiving a first selection of a particular internet radio station from among the plurality of internet radio stations;

in response to receiving the first selection, retrieving an internet radio stream associated with the selected internet radio station from the internet radio service;

outputting the internet radio stream to the display device;

receiving user input requesting that the first selection be added to a favorites list;

updating the favorites list with the first selection; and synchronizing a local favorites list stored in a communication device with the updated favorites list.

2. The set-top box of claim 1, wherein the processor further performs operations comprising outputting to the display device a plurality of search criteria.

3. The set-top box of claim 2, wherein the processor further performs operations comprising:

receiving a second selection of a particular search criteria from among the plurality of search criteria from a remote control interface module; and in response to receiving the second selection, retrieving information comprising the plurality of internet radio stations from the internet radio service, wherein content provided by the plurality of internet radio stations is related to the second selection.

4. The set-top box of claim 3, wherein receiving the first selection is in response to displaying the plurality of internet radio stations.

5. The set-top box of claim 2, wherein the plurality of search criteria comprises a genre of music.

6. The set-top box of claim 2, wherein the plurality of search criteria comprises a music artist.

7. The set-top box of claim 1, wherein prior to outputting the internet radio stream, the processor performs operations comprising determining that the selected internet radio station conforms to a parental control criteria.

8. A method comprising:

accessing an internet radio service on an internet protocol television network from a set-top box;

outputting from the set-top box to a display device coupled to the set-top box a list of a plurality of internet radio stations, the list being received from the internet radio service, the list being based on popularity of the plurality of internet radio stations within the internet protocol television network among subscribers to the internet protocol television network;

receiving at the set-top box a first selection of a particular internet radio station from among the plurality of internet radio stations, wherein the selection is received by the set-top box;

in response to receiving the selection, requesting, by the set-top box, an internet radio stream associated with the selected internet radio station from the internet radio service;

outputting, by the set-top box, the internet radio stream to the display device;

receiving, by the set-top box, user input requesting that the first selection be added to a favorites list;

updating, by the set-top box, the favorites list with the first selection; and causing, by the set-top box, a communication device having a local favorites list stored therein to update the local favorites list according to the updated favorites list.

9. The method of claim 8, further comprising outputting, by the set-top box, to the display device a plurality of search criteria.

10. The method of claim 9, further comprising:

receiving, by the set-top box, a second selection of a particular search criteria from among the plurality of search criteria; and in response to receiving the second selection, retrieving, by the set-top box, information comprising the plurality of radio stations, wherein content provided by the plurality of radio stations is related to the search criteria.

11. The method of claim 10, wherein receiving the first selection is in response to receiving the second selection.

12. The method of claim 9 wherein the plurality of search criteria comprises a genre of music.

13. The method of claim 9, wherein the plurality of search criteria comprises a music artist.

14. The method of claim 8, further comprising, prior to outputting the internet radio stream, determining, by the set-top box, that the selected internet radio station conforms to a parental control criteria.

15. A tangible computer-readable storage device, comprising computer instructions which, when executed by a processor, cause the processor to perform operations comprising:

accessing an internet radio service by way of an internet protocol television network;

outputting to a display a list of a plurality of internet radio stations, the list being received from the internet radio service, the list being based on popularity of the plurality of internet radio stations within the internet protocol television network among subscribers to the internet protocol television network;

receiving a first selection of an internet radio station from among the plurality of internet radio stations;

in response to receiving the selection, receiving an internet radio stream associated with the selected internet radio station from the internet radio service;

outputting the internet radio stream from a radio interface module to a display interface module on a particular internet protocol television channel;

receiving user input requesting that the first selection be added to a favorites list;

updating the favorites list with the first selection; and causing a communication device to update a local favorites list according to the updated favorites list.

16. The tangible computer-readable storage device of claim 15, wherein the operations further comprise outputting to the display a plurality of search criteria.

17. The tangible computer-readable storage device of claim 16, wherein the operations further comprise:

receiving a second selection of a particular search criteria from among the plurality of search criteria; and in response to receiving the second selection, retrieving information comprising the plurality of radio stations, wherein content provided by the plurality of radio stations is related to the search criteria.

18. The tangible computer-readable storage device of claim 17, wherein receiving the first selection is in response to receiving the second selection.

19. The tangible computer-readable storage device of claim 16, wherein the plurality of search criteria comprises a genre of music.

20. The tangible computer-readable storage device of claim 16, wherein the plurality of search criteria comprises a music artist.

\* \* \* \* \*